United States Patent
Beam

(10) Patent No.: US 9,981,269 B2
(45) Date of Patent: May 29, 2018

(54) APPARATUS AND SYSTEM FOR A TOWED DEVICE POWERED BY A TOW VEHICLE

(71) Applicant: Altec Industries, Inc., Birmingham, AL (US)

(72) Inventor: Dennis A. Beam, Shelby, NC (US)

(73) Assignee: Altec Industries, Inc., Birmingham, AL (US)

(*) Notice: Subject to any disclaimer, the term of this patent is extended or adjusted under 35 U.S.C. 154(b) by 79 days.

(21) Appl. No.: 15/338,708

(22) Filed: Oct. 31, 2016

(65) Prior Publication Data

US 2017/0043350 A1 Feb. 16, 2017

Related U.S. Application Data

(62) Division of application No. 13/836,522, filed on Mar. 15, 2013, now Pat. No. 9,480,990.

(60) Provisional application No. 61/650,794, filed on May 23, 2012.

(51) Int. Cl.
| | |
|---|---|
| *B27L 11/00* | (2006.01) |
| *B02C 18/24* | (2006.01) |
| *B02C 25/00* | (2006.01) |
| *A01G 3/00* | (2006.01) |

(52) U.S. Cl.
CPC .............. *B02C 18/24* (2013.01); *A01G 3/002* (2013.01); *B02C 25/00* (2013.01); *B27L 11/00* (2013.01)

(58) Field of Classification Search
CPC ........ B27L 11/00; B27L 11/005; B27L 11/02; B27L 11/04; B27L 11/06; B27L 11/08; B02C 2201/066; A01G 3/002
See application file for complete search history.

(56) References Cited

U.S. PATENT DOCUMENTS

| | | | | |
|---|---|---|---|---|
| 4,796,819 A | * | 1/1989 | Waterman | B27L 11/02 144/176 |
| 4,961,539 A | * | 10/1990 | Deem | B02C 21/02 241/101.741 |
| 5,205,496 A | * | 4/1993 | O'Donnell | B02C 13/04 241/152.2 |

* cited by examiner

*Primary Examiner* — Matthew G Katcoff
(74) *Attorney, Agent, or Firm* — Erise IP, P.A.

(57) ABSTRACT

An apparatus and a system directed to a towed device powered by a tow vehicle. The apparatus and system include a woodchipper configured to be mounted on a towed vehicle, with the towed vehicle configured to be towed behind the tow vehicle. Additionally, a motor may be coupled to the woodchipper to provide power to the woodchipper. A power converter obtains power from the tow vehicle from a power takeoff coupled to the tow vehicle. Further, one or more power transfer lines connect the power converter with the motor to communicate motor-operating power from the power converter to the motor.

Figure 1:
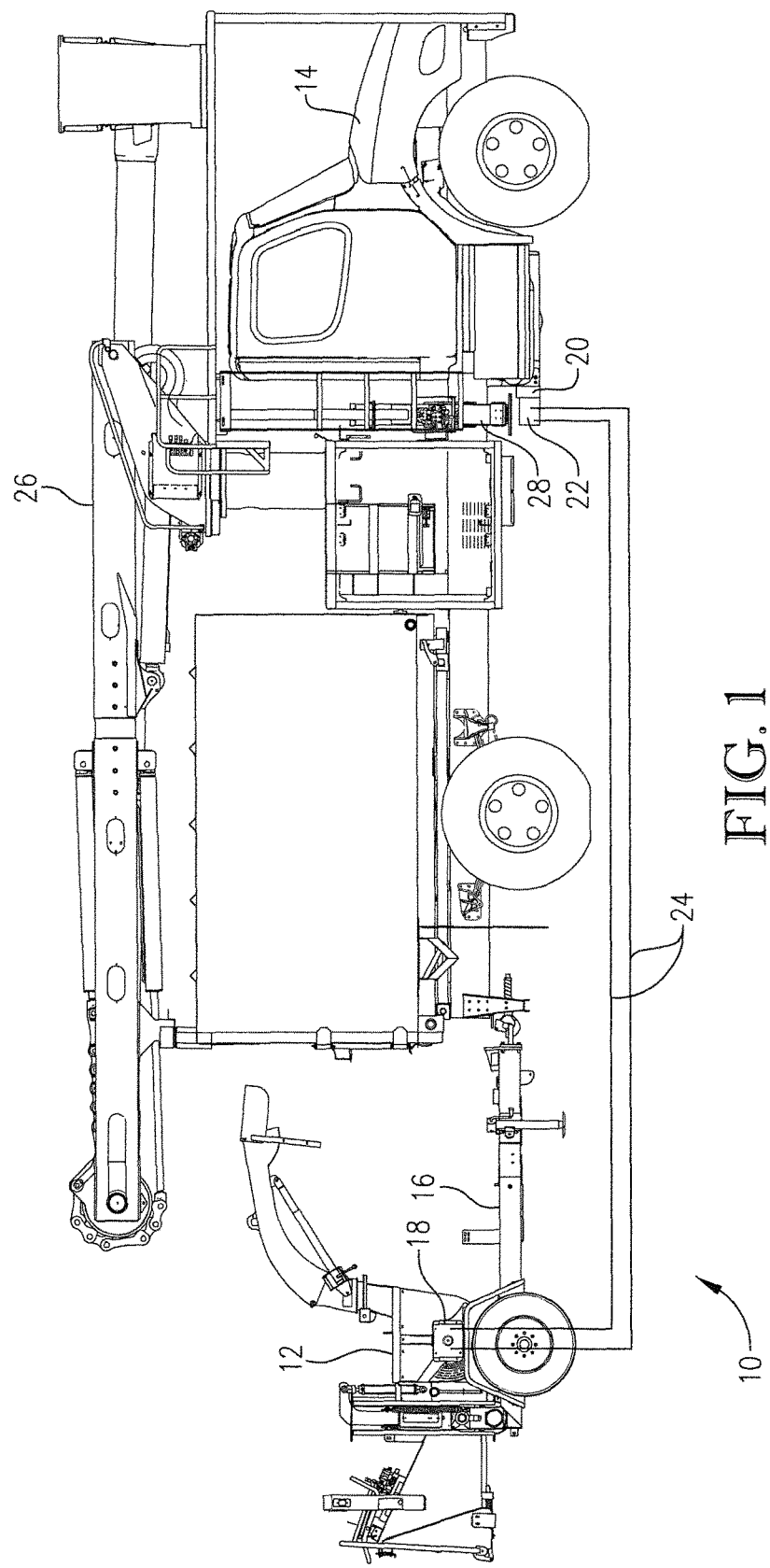

19 Claims, 2 Drawing Sheets

APPARATUS AND SYSTEM FOR A TOWED DEVICE POWERED BY A TOW VEHICLE

RELATED APPLICATION

This application is a divisional application of U.S. patent application Ser. No. 13/836,522, filed Mar. 15, 2013, and entitled "APPARATUS AND SYSTEM FOR A TOWED DEVICE POWERED BY A TOW VEHICLE," which is a non-provisional patent application of U.S. Provisional Patent Application No. 61/650,794, filed May 23, 2012, and entitled "APPARATUS AND SYSTEM FOR A TOWED DEVICE POWERED BY A TOW VEHICLE," the disclosures of which are hereby incorporated by reference in their entirety into the present application.

FIELD

The present invention is directed to an apparatus and a system for a towed device to be powered by a tow vehicle. In more detail, the present invention relates to a woodchipper, such as a wood, brush, and/or tree chipper used in the tree care and disposal industry, which is towed by a tow vehicle and which is further adapted for being powered by the tow vehicle. Further embodiments relate to other implements requiring power to operate, such as an aerial boom, a crane, a winch system, an auger, a digger derrick, or the like, to be powered by a tow vehicle.

BACKGROUND

Various styles of woodchipper systems for reducing trees, logs, and brush into smaller woodchips have been known and used. However, most styles of woodchipper systems are powered by dedicated gas or diesel-powered combustion engines. Such combustions engines are generally large, heavy, and thus cumbersome to transport. In addition, combustion engines are often the most costly aspect of a woodchipper system. Such costs are partly due to the price of the combustion engine, the price of fuel for the combustion engine, and the price required to maintain the combustion engine according to increasingly stringent emission regulations. Further, because combustion engines include complex integrated components, such combustion engines require significant amounts of time and money to service and repair the engines. Finally, combustion engines commonly output considerable amounts of noise pollution, which can be distracting and dangerous to users of the woodchipper systems and/or bystanders.

SUMMARY

Embodiments of the present invention include an apparatus and a system for powering an implement, such as a woodchipper with a tow vehicle. Exemplary embodiments include a woodchipper configured to be mounted on a towed vehicle, with the towed vehicle configured to be towed behind the tow vehicle. In certain embodiments, the tow vehicle and the towed vehicle are configured to operate on a highway at highway speeds. Embodiments additionally include a motor coupled to the woodchipper and operable to provide power to a cutting mechanism of the woodchipper; a power takeoff coupled to the tow vehicle and operable to obtain mechanical power from the tow vehicle; a power converter engaged with the power takeoff, with the power converter configured to convert the mechanical power obtained by the power takeoff into a motor-operating power operable to power the motor attached to the woodchipper; and one or more power transfer lines connecting the power converter with the motor and operable to communicate the motor-operating power from the power converter to the motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
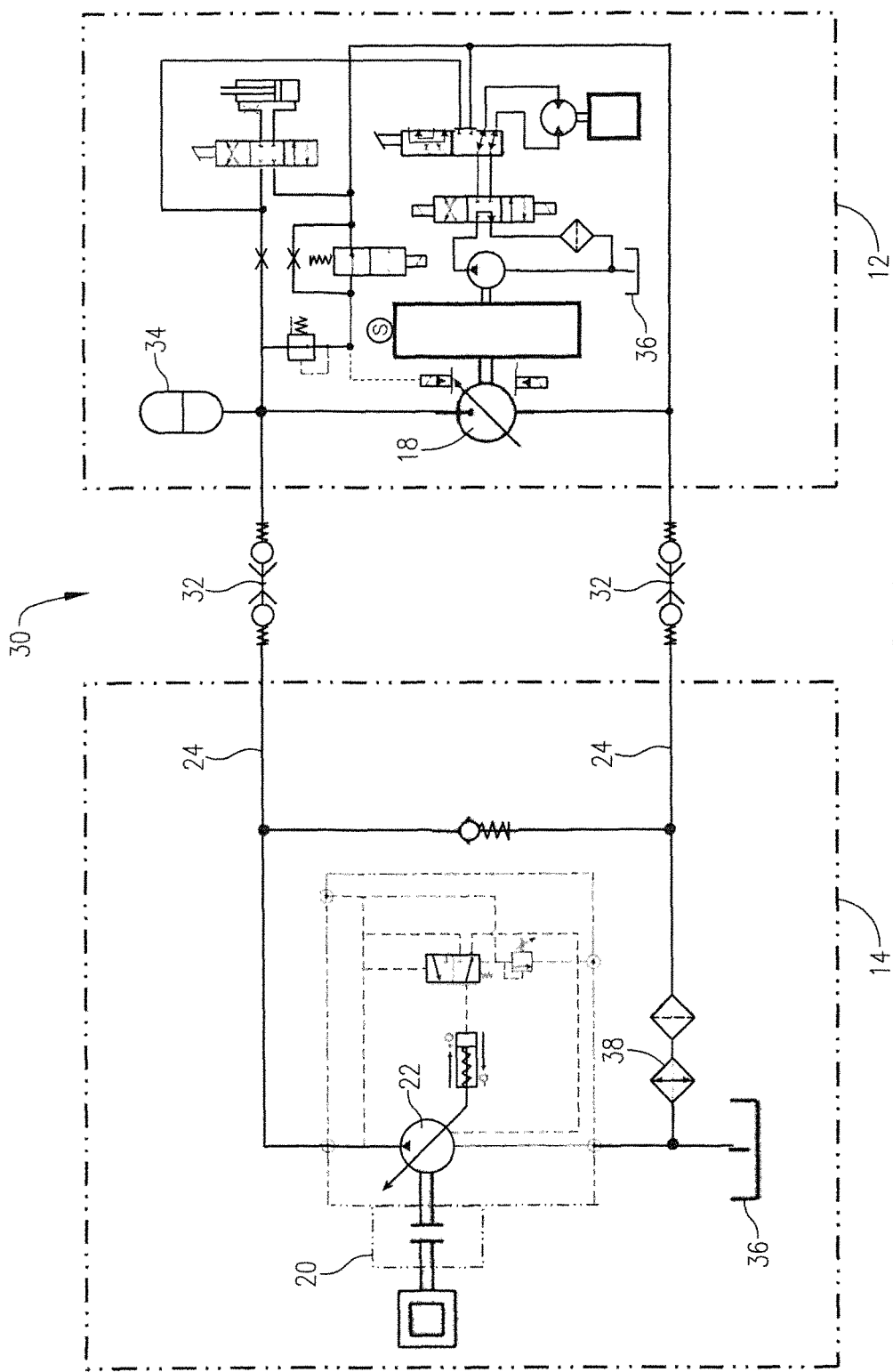

Embodiments of the present invention are described in detail below with reference to the attached drawing figures, wherein:

FIG. 1 is a schematic depiction of an engineless woodchipper system according to embodiments of the present invention, including an engineless woodchipper being towed by a tow vehicle; and FIG. 2 is a schematic diagram of a hydraulic system for powering a woodchipper from a power takeoff affixed to a tow vehicle according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

With reference to the drawings, an engineless woodchipper system 10 for powering a woodchipper 12 with power obtained from a tow vehicle 14 is illustrated in FIG. 1. The engineless woodchipper system 10 broadly comprises the woodchipper 12 configured to be mounted on a towed vehicle 16, with the towed vehicle configured to be towed behind the tow vehicle; a motor 18 coupled to the woodchipper and operable to provide power to a cutting mechanism of the woodchipper; a power takeoff 20 coupled to the tow vehicle and operable to obtain mechanical power from the tow vehicle; a power converter 22 engaged with the power takeoff, with the power converter configured to convert the mechanical power obtained by the power takeoff into a motor-operating power operable to power the motor; and one or more power transfer lines 24 connecting the power converter with the motor and operable to communicate the motor-operating power from the power converter to the motor. By connecting the components of the engineless woodchipper system 10 as described above, the woodchipper 12 can be powered by the tow vehicle 14, such that the woodchipper does not require its own dedicated combustion engine for powering the cutting mechanism and/or other auxiliary components of the woodchipper.

As used herein, the woodchipper 12 may broadly include any type of machine or device that reduces wood (e.g., trees, limbs, brush, etc.) into smaller woodchips. The woodchipper 12 generally includes an inlet hopper for receiving wood into the woodchipper; a cutting mechanism, such as a rotary cutting disc, a drum blade, or a screw blade, which operates to reduce the received wood into smaller woodchips; and a discharge chute for ejecting the smaller woodchips from the woodchipper. In certain other embodiments, the woodchipper 12 may include additional associated components such as feed rollers for assisting the wood as the wood is introduced into the woodchipper and lift cylinders for raising or lowering the feed rollers and/or cutting mechanics as the wood is being reduced. In particular, the lift cylinders may provide assistance for clearing received wood that is clogging the cutting mechanism. Further, the woodchipper 12 may include a mechanical flywheel or other similar component for storing energy and providing the stored energy to the cutting mechanism of the woodchipper or other associated components as needed.

Embodiments of the present invention provide for the powering of a towed device other than a woodchipper. In particular, although a woodchipper is described herein as the exemplary towed device, embodiments of the present invention additionally include powering other systems or devices from a tow vehicle. Such other systems or devices may include, for instance, an aerial boom, a crane, a winch system, a plow blade, an auger, a digger derrick, or the like. Therefore, the description herein of the exemplary woodchipper should not be considered as limiting.

The tow vehicle 14 broadly includes any vehicle that is operable to tow the towed vehicle 16 and woodchipper 12 and that is further operable to provide power for the woodchipper to operate. In certain embodiments, the tow vehicle 14 may be a conventional diesel or gasoline-powered utility truck adapted for use in the tree care industry and may include, for example, a covered bed for collecting and hauling refuse, as well as towing attachments and accessories for connecting to and pulling towed vehicles. The tow vehicle 14 includes the necessary components for coupling to the power takeoff 20. The power takeoff may be coupled to the tow vehicle's transmission, which may be automatic or manual, or in other embodiments, to the tow vehicle's engine. The power takeoff 20 is coupled to the tow vehicle 14 in such a manner that the power takeoff obtains mechanical energy from the tow vehicle. For instance, the power takeoff 20 may include a gear assembly that engages with gears included in the tow vehicle's 14 transmission. In such an embodiment, the tow vehicle's 14 transmission can transmit mechanical power to the gear assembly of the power takeoff 20, which in turn transmits mechanical energy to a drive shaft of the power takeoff. In addition to such a mechanical linkage, the power takeoff 20 may be linked to the tow vehicle 14 via pneumatic, hydraulic, or electrical linkages. Furthermore, the power takeoff 20 described above is one exemplary method of deriving power from the tow vehicle 14. Other methods may be used to obtain power from the tow vehicle 14, such as by including a drive shaft connected directly to the tow vehicle's engine crank shaft.

The towed vehicle 16 is configured to support the woodchipper 12, including the cutting mechanism and all associated components and structure, such as the motor 18, the feed rollers, the lift cylinders, and the discharge chute. Because the towed vehicle 16 is configured to be pulled behind the tow vehicle 14, the towed vehicle is not required to have its own power source. Both the tow vehicle 14 and the towed vehicle 16 (and therefore, the woodchipper 12 or other powered implement) are built to be driven on all common roadways at normal traffic speeds. Therefore, the tow vehicle 14 and the towed vehicle 16 are built to conform to all laws and regulations governing the functionality of vehicles to be used on such roadways, such as height, width and weight limits, the configuration and placement of vehicle lights, turn signals, emergency signals, emissions standards, safety features such as seat belts, and so forth. Furthermore, the tow vehicle 14 and the towed vehicle 16 are built to safely travel at normal highways speeds, such as sixty or seventy miles per hour. However, additional embodiments of the present invention may provide for the tow vehicle 14 and the towed vehicle 16 to operate in off-highway conditions. For instance, the tow vehicle 14 and the towed vehicle 16 may be required to operate on off-highway terrain, such as dirt roads, roadsides, yards, hills, or other forms of right-of-ways.

In additional embodiments, the tow vehicle 14 may include other components that are powered by the tow vehicle, such as an aerial boom 26, stabilizers 28, a crane (not shown), a winch system (not shown), plow blades (not shown), augers (not shown), or the like. In such embodiments, the components of the engineless woodchipper system 10 that are coupled with the tow vehicle 14 and that are used to power the woodchipper 12 (i.e., the power takeoff 20 and the power converter 22) may be separate and isolated from other systems on the tow vehicle, such as hydraulic or electrical systems, that are used to power the other tow vehicle components (e.g., aerial boom 26, stabilizer 28, etc.). By thus separating the engineless woodchipper system 10 of the present invention from other systems on the tow vehicle 14, the engineless woodchipper system may be operated and maintained independently of such other systems. It will be appreciated, however, that the engineless woodchipper system 10 used to power the woodchipper 12 may also be integral with or otherwise associated with the other systems of the tow vehicle 14 without departing from the scope of the present invention.

Embodiments of the present invention provide for the remaining components of the engineless woodchipper system 10 (i.e., the motor 18, the power converter 22, and the one or more power transfer lines 24) to each have multiple embodiments depending on the preferred type of power used for operating the woodchipper 12. For instance, in certain embodiments, the woodchipper may be powered by hydraulic power, such that the remaining components are directed to a hydraulic system with hydraulic components. In other embodiments, the woodchipper may be powered by electrical power, such that the remaining components are directed to an electrical system with electrical components. Although embodiments discussed in more detail below will generally be directed to either hydraulic or electrical systems, it is understood that embodiments of the present invention may include other systems, such as mechanical systems, that are operable to transmit power to the woodchipper 12 from the tow vehicle 14.

An exemplary hydraulic system 30 for use in the engineless woodchipper system 10 is illustrated in FIG. 2. The hydraulic system 30 includes the power converter 22 in the form of a hydraulic pump that is operable to convert the mechanical power from the power takeoff 20 into hydraulic power (i.e., pressurized hydraulic fluid); the motor 18 in the form of a hydraulic motor that is operable to power the cutting mechanism of the woodchipper 12 by converting the hydraulic power (i.e., the pressurized hydraulic fluid) from the hydraulic pump back into mechanical power; and the power transfer lines 24 in the form of hydraulic fluid lines that connect the hydraulic pump to the hydraulic motor and communicate therebetween the pressurized hydraulic fluid. In certain embodiments, the hydraulic pump may include a variable displacement hydraulic pump, such as an axial piston pump, a variable vane pump, or a bent-axis pump, which allows for the displacement of hydraulic fluid to be varied while the hydraulic pump is running. In other embodiments, the hydraulic pump may include a constant displacement pump, such as a gear pump, a fixed vane pump, or a screw pump, which allows for the displacement of hydraulic fluid to be held constant while the hydraulic pump is running. Embodiments of the present invention further provide for the hydraulic motors, which may be of similar types as the hydraulic pumps (i.e., axial piston, gear, vane, bent-axis, screw, etc.), to be either variable or constant output, as may be required to implement embodiments of the present invention.

In certain embodiments, it may be beneficial for the hydraulic system 30 to include a variable displacement hydraulic pump along with a variable output hydraulic motor. Such embodiments may, in certain instances, be operationally more efficient than a constant displacement gear-type hydraulic pump used along with a constant output hydraulic motor. As an example, the variable displacement hydraulic pump may be configured to consistently operate at an elevated operating pressure. By maintaining an elevated operational pressure, the variable displacement hydraulic pump is only required to produce a high volume displacement when such high volume displacement is needed by the variable output hydraulic motor to maintain the woodchipper's 12 cutting mechanism at required rotations speeds. The variable displacement hydraulic pump can increase displacement by increasing a stroking distance (i.e., stroking) of pistons within the pump. The variable displacement hydraulic pump can additionally reduce displacement by de-stroking the pistons to provide less displacement when the cutting mechanism does not require substantial power to maintain rotational speed, which results in more efficient operation and may generate less heat that requires dissipation. For instance, a high displacement of hydraulic fluid may be required when the woodchipper 12 has received a large piece of wood, such that the cutting mechanism needs substantial power to maintain the rotational speed necessary to reduce the wood into smaller wood chips. However, when the woodchipper 12 is not receiving wood, and is thus idling, a high displacement from the variable displacement hydraulic pump is not required. In such embodiments, the hydraulic system 30 does not require any electronic feedback (e.g., chipper power, torque or speed demands) to be supplied to the variable displacement hydraulic pump. Instead, the displacement of the variable displacement hydraulic pump may be controlled by simply monitoring the variable displacement hydraulic pump's own output pressure. By maintaining a high operating pressure, the variable displacement hydraulic pump is always outputting the minimum flow needed to sustain the speed of the cutting mechanism. In certain embodiments, the variable output hydraulic motor may be required to include a speed control algorithm, which is used to adjust a stroke of the variable output hydraulic motor while driving the cutting mechanism of the woodchipper 12. Such a control algorithm may be required to insure that the variable output hydraulic motor maintains the cutting mechanism's required rotational speed.

As an alternative embodiment, the hydraulic system 30 may include a variable displacement hydraulic pump with a power limitation control (e.g., torque and/or pressure control), which can be used in conjunction with a constant output hydraulic motor to power the cutting mechanism. In certain instances, such an embodiment may provide a more efficient method of powering the cutting mechanism, as the variable displacement hydraulic pump is required to displace only the amount of hydraulic fluid necessary to power the constant output hydraulic motor. In addition to the variable displacement hydraulic pump with the variable output hydraulic motor and the variable displacement hydraulic pump with the constant output hydraulic motor, as were described above, the hydraulic system 30 of embodiments of the present invention may include a constant displacement hydraulic pump with the variable output hydraulic motor and a constant displacement hydraulic pump with the constant output hydraulic motor.

In even further embodiments, the hydraulic pump and/or hydraulic motor may include an automated de-stroking feature. In the event the supply line becomes obstructed during operation, the hydraulic pump and/or the hydraulic motor may sense the pressure of the hydraulic fluid beginning to rise above a threshold level and will de-stroke before dangerous pressure levels are reached. Such a de-stroking capability may help to avoid a blowout or component failure. In further embodiments, the automated de-stroking feature may be embodied in the form of an emergency stop switch, which can be implemented by a user of embodiments of the present invention to rapidly shut down operation of the woodchipper 12.

The hydraulic system 30 may additionally include the power transfer lines 24 in the form of hydraulic fluid lines for communicating the pressurized hydraulic fluid, and thus hydraulic power, between the hydraulic pump and the hydraulic motor. In certain embodiments, such as hydraulic system 30, there may be at least two hydraulic fluid lines, so as to include a hydraulic fluid feed line and a hydraulic fluid return line. The hydraulic fluid lines may generally be flexible, such that when unused, the hydraulic fluid lines may be wrapped-up into a small volume for storage and transport.

In certain embodiments, such as illustrated in FIG. 2, the hydraulic system 30 may include one or more connectors for connecting various components of the hydraulic system. The one or more connectors may include hydraulic quick-connect connectors 32 for connecting the hydraulic fluid lines to other hydraulic fluid lines, the hydraulic pump, and/or the hydraulic motor. The hydraulic quick-connect connectors 32 are operable to allow a user of embodiments of the present invention to quickly connect and disconnect the hydraulic fluid lines, by hand, with other components of the hydraulic system 30. In certain embodiments, the hydraulic quick-connect connectors 32 may be included on ends of the hydraulic fluid lines and the hydraulic pump, such that the hydraulic motor on the woodchipper 12 can be quickly connected, via the hydraulic fluid lines, with the hydraulic pump on the tow vehicle 14. However, as previously described, the hydraulic quick-connect connectors 32 may be included on multiple components of the hydraulic system 30, as necessary.

In further embodiments, the hydraulic system 30 may include one or more hydraulic accumulators 34. The hydraulic accumulators 34, along with the flywheel (if included) of the woodchipper 12, operates to store energy and provide such stored energy to the cutting mechanism of the woodchipper 12 or other component as needed. In particular, the hydraulic accumulator 34 and/or flywheel may allow for more constant loading of the hydraulic pump and/or hydraulic motor, which may result in more efficient operation.

In yet further embodiments, the hydraulic system 30 may include one or more hydraulic reservoirs 36 for storing the hydraulic fluid necessary for operation of the hydraulic system and one or more cooling systems 38 for maintaining operational temperatures of the hydraulic system. Embodiments of the present invention provide for each of the accumulator, reservoir, and cooling system to be integrated with the hydraulic system 30 at the tow vehicle 14 or at the woodchipper 12 (i.e., on the towed vehicle 16). The hydraulic system 30 may additionally include additional components as may be required for proper operation of the hydraulic system, such as additional hydraulic lines or hoses, additional hydraulic reservoirs, hydraulic valves, additional hydraulic pumps or motors, filters, or the like. Although the hydraulic system 30, as shown in FIG. 2, illustrates specific placement of components of the hydraulic system 30, it is understood that such an illustration is exemplary, and embodiments of the present invention include additional placements of the components that perform substantially the same function in substantially the same way.

The hydraulic system 30 included in the engineless woodchipper system 10, as described above, may be used to drive the chipper cutting mechanism on the woodchipper 12 as well as auxiliary components and functions of the woodchipper, such as feed rollers, lift cylinders, discharge chute, or the like. Alternatively, a second hydraulic pump may be used simultaneously with the first hydraulic pump described above. In such an embodiment, the first hydraulic pump provides hydraulic power to the hydraulic motor powering the cutting mechanism of the woodchipper 12, and the second hydraulic pump provides power to the auxiliary components of the woodchipper. The second hydraulic pump may be mounted in tandem with the first hydraulic pump to be driven by the power takeoff 20, or the second hydraulic pump may be driven by a separate, second power takeoff. By way of example, the first hydraulic pump may provide power to a first hydraulic motor that drives only the cutting mechanism of the woodchipper 12, while the second hydraulic pump may provide power to a separate, second hydraulic motor, that drives the auxiliary components (e.g., the feed roller, the lift cylinder, etc.) of the woodchipper. In the above example, the two hydraulic pumps and two hydraulic cylinders may be completely isolated, or may be partially isolated wherein they share a hydraulic fluid return path. A system with two hydraulic pumps driven by separate power takeoffs has the advantage of enabling operation of the auxiliary components of the woodchipper, or other non-woodchipper components, even when the cutting mechanism is obstructed or otherwise not operational.

In addition to the hydraulic system 30, the engineless woodchipper system 10 may be implemented via an electrical system. The electrical system may include the power converter 22 in the form of an electric generator that is operable to convert the mechanical power from the power takeoff 20 into electrical power (i.e., electrical current and voltage); the motor 18 in the form of an electric motor that is operable to power the cutting mechanism of the woodchipper 12 by converting the electrical power (i.e., the electrical current and voltage) from the electric generator back into mechanical power; and the power transfer lines 24 in the form of electrically conductive cables that connect the electric generator to the electric motor and communicate therebetween the electrical power. In certain embodiments, the electric generator may include a generator control system, such as an AC drive, a variable frequency drive, a voltage regulator, an excitation control, a rectifier, or the like, which allows for an output of the electric generator (i.e., electrical current and/or voltage) to be controlled while the electric generator is running. In other embodiments, the electric generator may not include the generator control system, such that the output of the electric generator is based solely on the mechanical power obtained from the power takeoff 20 and a design/construction of the electric generator. Embodiments of the present invention further provide for the electric motor to include a motor control system, such as an AC drive, a variable frequency drive, a rectifier, a DC drive, or the like, which may be used to control the direction, speed, and/or torque output of the electric motor. In additional embodiments, the electric motor may not include the motor control system, such that the direction, speed, and/or torque output of the electric motor is dependent only on the power received from the electric generator and a design of the electric motor. Embodiments of the present invention include any combination of electric generator, electric motor, and/or their respective control systems. For instance, embodiments may include: the electric generator in combination with the electric motor; the electric generator and generator control system in combination with the electric motor; the electric generator in combination with the electric motor and motor control system; and the electric generator and generator control system in combination with the electric motor and motor control system. In addition and as will be described below, embodiments of the present invention may include the use of multiple electric generators, electric motors, and/or control systems.

As described above, the electrical system may include the one or more power transfer lines 24 in the form of electrically conductive cables ("electric cables") for communicating the electric power between the electric generator and the electric motor. The electric cables may generally be flexible, such that when unused, the electric cables may be wrapped-up into a small volume for storage and transport. In certain embodiments, the electrical system may include one or more connectors for connecting various components of the electrical system. The one or more connectors may include electrical quick-connect connectors for connecting the electric cables to other electric cables, the electric generator, and/or the electric motor. The electric quick-connect connectors are operable to allow a user of embodiments of the present invention to quickly connect and disconnect the electric cables, by hand, with other components of the electrical system. In certain embodiments, the electric quick-connect connectors may be included on ends of the electric cables and the electric generator, such that the electric motor on the woodchipper 12 can be quickly connected, via the electric cables, with the electric generator on the tow vehicle 14. However, as previously described, the electric quick-connect connectors may be included on multiple components of the electric system, as necessary.

In further embodiments, the electrical system may include one or more electric accumulators, such as batteries and/or capacitors. The electric accumulators, along with the flywheel (if included) of the woodchipper 12, operate to store energy and provide such stored energy to the cutting mechanism of the woodchipper 12 or other component as needed. In particular, the electric accumulator and/or flywheel may allow for more constant loading of the electric generator and/or electric motor, resulting in more efficient operation. In further embodiments, the electrical system may include an emergency stop switch, which can be implemented by a user of embodiments of the present invention to rapidly shut down operation of the woodchipper 12.

In yet further embodiments, the electrical system may include one or more cooling systems for maintaining operational temperature of the electrical system. Embodiments of the present invention provide for each of the electric accumulator and cooling system to be integrated with the electrical system at the tow vehicle 14 or at the woodchipper 12 (i.e., on the towed vehicle 16).

The electrical system may further include additional components necessary for supporting operation of the electric generator, the electric motor, and conveying electrical power via the electrical cables. Such additional components may include, for example, microcontrollers or similar control devices, additional electrical power and transmission lines, fuses or circuit breakers, voltage regulators, rectifiers, inverters, diode bridges, SCR bridges, and one or more connectors for connecting various components of the electrical system. In even further embodiments, the electrical system may include other sources of electrical power. For instance, the electrical system may include one or more additional electric power sources, such as electrical generators, rechargeable battery packs, or solar power units, which may each be located on the tow vehicle 14 or the towed vehicle 16. Such one or more additional electric power sources may facilitate the continued operation of the woodchipper 12, or other components, when the tow vehicle 14 or the electric generator attached to the tow vehicle are in need of repair or otherwise become inoperable.

The electrical system included in the engineless woodchipper system 10, as described above, may be used to drive the chipper cutting mechanism on the woodchipper 12 as well as auxiliary components and functions of the woodchipper, such as feed rollers, lift cylinders, discharge chute, or the like. Alternatively, a second electric generator may be used simultaneously with the first electric generator described above. In such an embodiment, the first electric generator provides electric power to the electric motor powering the cutting mechanism of the woodchipper 12, and the second electric generator provides power to the auxiliary components of the woodchipper. The second electric generator may be mounted in tandem with the first electric generator to be driven by the power takeoff 20, or the second electric generator may be driven by a separate, second power takeoff. By way of example, the first electric generator may provide power to a first electric motor that drives only the cutting mechanism of the woodchipper 12, while the second electric generator may provide power to a separate, second electric motor, that drives the auxiliary components (e.g., the feed roller, the lift cylinder, etc.) of the woodchipper. In the above example, the two electric generators and two electric motors may be completely isolated, or may be partially isolated wherein they share similar electrical cables. A system with two electric generators driven by separate power takeoffs has the advantage of enabling operation of the auxiliary components of the woodchipper, or other non-woodchipper components, even when the cutting mechanism is obstructed or otherwise not operational.

Although this invention has been described with its preferred embodiment(s), it is noted that equivalents may be employed and substitutions made herein without departing from the scope of the invention.

Having thus described various embodiments of the invention, what is claimed as new and desired to be protected by Letters Patent includes the following:

1. An engineless woodchipper system for powering a woodchipper with a tow vehicle, comprising:
   a woodchipper configured to be mounted on a towed vehicle, wherein the towed vehicle is configured to be towed behind the tow vehicle,
   wherein the tow vehicle and the towed vehicle are configured to operate on a highway at highway speeds;
   an electric motor coupled to the woodchipper and operable to provide power to a cutting mechanism of the woodchipper;
   a power takeoff coupled to the tow vehicle and operable to obtain mechanical power from the tow vehicle;
   a power converter engaged with the power takeoff, wherein the power converter is configured to convert the mechanical power obtained by the power takeoff into a motor-operating power operable to power the motor attached to the woodchipper; and
   one or more power transfer lines connecting the power converter with the motor and operable to communicate the motor-operating power from the power converter to the motor.

2. The engineless woodchipper system of claim 1, wherein the motor is further operable to power auxiliary components of the woodchipper, including one or more of the following: a feed roller, a lift cylinder, and a discharge chute.

3. The engineless woodchipper system of claim 1, wherein the electric motor is selected from a variable output motor or a fixed output motor.

4. The engineless woodchipper system of claim 1, wherein the electric motor includes a control system for controlling a speed of the motor.

5. The engineless woodchipper system of claim 1, wherein the electric motor includes a control system for controlling a torque of the motor.

6. The engineless woodchipper system of claim 1, wherein the electric motor includes a control system for controlling a direction of the motor.

7. The engineless woodchipper system of claim 1, wherein the power converter is an electric generator.

8. The engineless woodchipper system of claim 7, wherein the electric generator includes a control system for controlling an output of the electric generator.

9. The engineless woodchipper system of claim 1, wherein the one or more power transfer lines are electric cables.

10. An engineless woodchipper system for powering a woodchipper with a tow vehicle, comprising:
   a woodchipper having a cutting mechanism configured to be mounted on a towed vehicle, wherein the towed vehicle is configured to be towed behind the tow vehicle,
   wherein the tow vehicle and the towed vehicle are configured to operate on a highway at highway speeds;

an electric motor coupled to the woodchipper and operable to provide power to a cutting mechanism of the woodchipper;

a power takeoff coupled to the tow vehicle and operable to obtain mechanical power from the tow vehicle;

an electric generator engaged with the power takeoff, wherein the electric generator is configured to convert the mechanical power obtained by the power takeoff into electrical power operable to power the electric motor attached to the woodchipper; and one or more power electric cables connecting the electric generator with the electric motor and operable to communicate the electrical power from the electric generator to the electric motor.

11. The engineless woodchipper system of claim 10, wherein the electric motor includes a control system for controlling a speed of the motor.

12. The engineless woodchipper system of claim 10, wherein the electric motor includes a control system for controlling a torque of the motor.

13. The engineless woodchipper system of claim 10, wherein the electric motor includes a control system for controlling a direction of the motor.

14. The engineless woodchipper system of claim 10, wherein the electric generator includes a control system for controlling an output of the electric generator.

15. An engineless woodchipper system configured to power a woodchipper with a tow vehicle, comprising:

a woodchipper having a cutting mechanism;

an electric motor configured to be coupled to the woodchipper and operable to provide power to a cutting mechanism of the woodchipper;

a power converter configured to be engaged with a power takeoff of the tow vehicle, wherein the power converter is configured to convert mechanical power obtained by the power takeoff into a motor-operating power operable to power the motor attached to the woodchipper; and one or more power transfer lines connecting the power converter with the motor and operable to communicate the motor-operating power from the power converter to the motor.

16. The engineless woodchipper system of claim 15, wherein the motor is further operable to power auxiliary components of the woodchipper, including one or more of the following: a feed roller, a lift cylinder, and a discharge chute.

17. The engineless woodchipper system of claim 15, wherein the electric motor is selected from a variable output motor or a fixed output motor.

18. The engineless woodchipper system of claim 15, wherein the electric motor includes a control system for controlling one or more of the following: a speed of the motor, a torque of the motor, and a direction of the motor.

19. The engineless woodchipper system of claim 15, wherein the power converter is an electric generator that includes a control system for controlling an output of the electric generator.

* * * * *